G. F. A. McDOUGALL.
AUTOMOBILE SIGNAL.
APPLICATION FILED SEPT. 11, 1914.
1,157,561.
Patented Oct. 19, 1915.
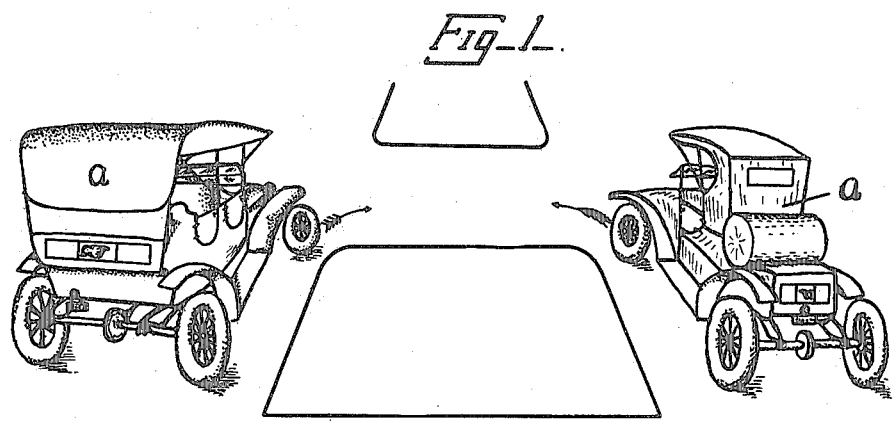
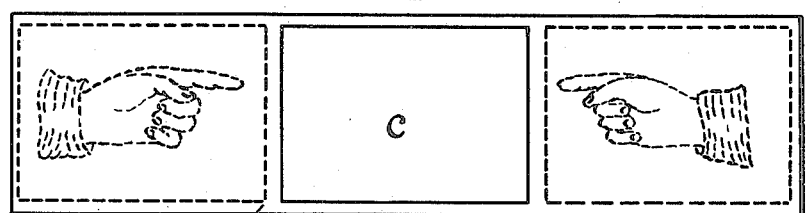
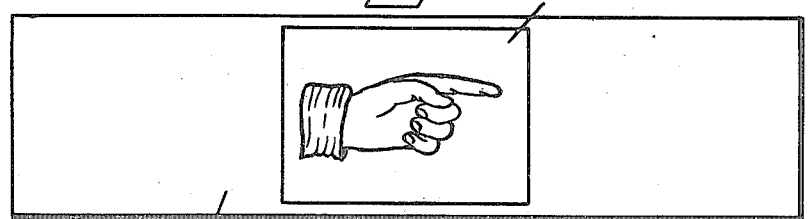
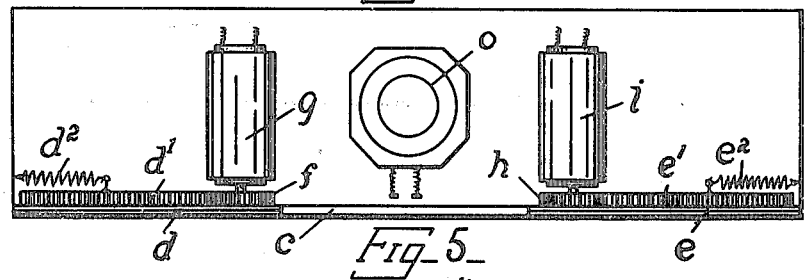
WITNESSES:
Edward A. Breed,
Elsie P. Grunert.
INVENTOR,
GEORGE F. A. McDOUGALL,
BY
Allen & Daggett,
ATTORNEYS.

UNITED STATES PATENT OFFICE.

GEORGE F. A. McDOUGALL, OF BOSTON, MASSACHUSETTS, ASSIGNOR OF ONE-HALF TO WINSLOW L. JENKINS, OF WEST SOMERVILLE, MASSACHUSETTS.

AUTOMOBILE-SIGNAL.

1,157,561.      Specification of Letters Patent.      Patented Oct. 19, 1915.

Application filed September 11, 1914. Serial No. 861,186.

*To all whom it may concern:*

Be it known that I, GEORGE F. A. McDOUGALL, a citizen of the United States, residing at Boston, in the county of Suffolk, in the State of Massachusetts, have invented a certain new and useful Improvement in Automobile-Signals, of which the following is a specification, reference being had to the accompanying drawings.

The object of this invention is to provide an effective, and reasonably cheap, visible signal for use with automobiles and the like vehicles, which signal will be automatically, and prominently exhibited at the rear of such a vehicle whenever the vehicle turns to the right or to the left hand, in order to give due notice of such turning to vehicles following; thus leaving both hands of the chauffeur, or driver, free to operate the steering wheel, clutch levers and other controlling devices of said vehicle.

My said invention is illustrated in, and by means of, the annexed drawings, Figure 1 being a perspective view of two automobiles equipped with my improved signal and showing thereby that said automobiles are turning from a right line; the auto at the left hand side of said Fig. 1 having started to turn to the right, and the auto at the right hand side of said Fig. 1 having started to turn toward the left hand. Fig. 2 is a relatively enlarged rear end elevation of a housing or casing which is mounted at the rear end portion of the auto and which contains the movable indicator, or signaling device, and Fig. 3 is a similar view showing my indicator exposed. Fig. 4 is a plan view of the said housing with the top wall removed so as to disclose the interior, operative parts of my device. Fig. 5 is a diagrammatic plan view of two motors, *g—i*, and illustrating a simple scheme for wiring said magnets in circuit with a circuit maker and breaker carried by the steering wheel post, and so that, when said post is partially rotated in the operation of steering the auto, the proper electric circuit will be closed to energize one of the said magnets and thus move into view the proper indicator, as I will explain more in detail later.

Referring to these drawings, the letter *a* indicates an automobile and *b* a housing or box-like casing which is attached to the auto in position to be plainly seen by the drivers of following vehicles; said housing having a central opening *c*. Mounted to slide longitudinally in the said housing are plates *d* and *e* that are, preferably, of transparent material, as glass or celluloid, and having painted, printed or otherwise fixed thereon indicators which point in opposite directions. For example, the plate *d* carries a hand with index finger extended and pointing to the right hand and the slidable plate *e* carries a hand with its index finger pointing to the left hand, as will be understood by reference to Fig. 2 of the drawings. When plate *d* is slid forward (that is to say, toward the right hand) its indicator appears in the opening *c*, as seen in Fig. 3 and, when the plate *e* is slid forward (that is to say, toward the left hand) its indicator appears in the said opening. Notice is thus given to following vehicles that the auto carrying the said signal is about to turn in the direction indicated by the exposed signal.

Secured to plate *d* is a toothed rack *d'* which is engaged by a pinion gear *f* mounted on the shaft of an electric motor *g* in such manner that the rotation or partial rotation of the said shaft will operate to move the rack *d'* and the connected plate *d* forward until the indicator of said plate is exposed to view in the opening *c*. Secured to the plate *e* is a rack *e'* which is slidably controlled by a pinion gear *h* carried by the shaft of a small motor *i*. These two motors are by preference connected in circuit with a make and break which is controlled by the rotative movements of the steering wheel. As here illustrated, the steering wheel post which is denoted by the reference letter *k*, is connected by wire 10 with a suitable battery, which latter is connected by branch wires to one pole of each of the motors, being connected respectively with fixed contacts 11—12 by wires 13 and 14. Said contacts 11 and 12 are located in the circular path traversed by a projection *k'* of rib form, carried by the steering post *k*, the described arrangement of contact parts being such that, when the steering wheel is operated to turn the auto to the right hand, the contact at 11 will be closed and the motor *g* will be energized, thus moving the plate *d* forward and exposing the indicator seen in Fig. 3. *Per contra*, when the wheel is operated to turn the auto to the left hand, the contact at 12 is engaged and the proper circuit is closed to energize the motor *i* and 110 thus move the plate *e* forward so as to expose its indicator. When, however, the steering wheel is set at its "straight-ahead" position, both circuits are open and both plates (*d* and *e*) are in their normal positions; said plates being returned to such normal positions after exposure, by means of springs $d^2$ and $e^2$.

I have already mentioned that the indicator plates *d* and *e* are, preferably, made of transparent material. In order that the indicators may be readily seen at night, I provide just back of the opening *c* an electric light bulb *o* whose wire terminals are located in the paths traversed by the racks *d'* and *e'* and so that the said racks will make a brushing contact with said terminals when either of said racks is moved forward; the said racks being included in any suitable electric circuit, so that the light *o* will be lighted when either of the racks is moved forward, and will be extinguished when said racks return to their normal positions.

*p* denotes a reflector.

While I have described in detail means for automatically controlling the desired movements of the indicator plates by connecting the same with the steering wheel post, it will be obvious that the motor circuits could be closed manually by the driver of the auto by means of some suitable form of switch or other make and break, but I prefer the described automatic control as it leaves both hands of the driver free.

Having thus described my invention, I claim as new and wish to secure by Letters Patent:—

A device of the class described comprising a casing, said casing having an opening formed centrally in its rear wall, plates slidably mounted in the casing and normally on opposite sides of the opening, and having rack-bars fixed adjacent their lower edges and of the same length as the plates, said plates corresponding in shape and size to the opening, motors mounted in the casing and having their shafts disposed at right angles to the rack-bars, pinions fixed to the motor shafts and in mesh with the rack-bars, means yieldably connecting the plates and casing to normally hold the plates concealed in the casing, and means distant from the casing to start one motor at a time for moving the associated plate to cover said opening.

GEORGE F. A. McDOUGALL.

Witnesses:
FRANK H. ALLEN,
MARION I. FERGUSON.

Copies of this patent may be obtained for five cents each, by addressing the "Commissioner of Patents, Washington, D. C."